(12) United States Patent
Fu et al.

(10) Patent No.: US 9,972,988 B2
(45) Date of Patent: May 15, 2018

(54) MULTI-FUNCTIONAL DIRECT CURRENT ICE MELTING AUTOMATIC SWITCHING CIRCUIT AND SWITCHING METHOD THEREOF

(75) Inventors: Chuang Fu, Guangzhou (CN); Hong Rao, Guangzhou (CN); Shukai Xu, Guangzhou (CN); Xiaolin Li, Guangzhou (CN)

(73) Assignee: ELECTRIC POWER RESEARCH INSTITUTE, CHINA SOUTHERN POWER GRID, Guangdong (CN)

( * ) Notice: Subject to any disclaimer, the term of this patent is extended or adjusted under 35 U.S.C. 154(b) by 1038 days.

(21) Appl. No.: 14/357,169

(22) PCT Filed: May 21, 2012

(86) PCT No.: PCT/CN2012/000702
§ 371 (c)(1),
(2), (4) Date: Sep. 22, 2014

(87) PCT Pub. No.: WO2013/067754
PCT Pub. Date: May 16, 2013

(65) Prior Publication Data
US 2015/0042176 A1    Feb. 12, 2015

(30) Foreign Application Priority Data
Nov. 9, 2011    (CN) .......................... 2011 1 0353317

(51) Int. Cl.
*H02G 7/16*    (2006.01)
*H02J 3/02*    (2006.01)

(52) U.S. Cl.
CPC ................ *H02G 7/16* (2013.01); *H02J 3/02* (2013.01); *Y10T 307/747* (2015.04)

(58) Field of Classification Search
CPC .......... H02G 7/16; H02J 3/02; Y10T 307/747; H02M 7/19
See application file for complete search history.

(56) References Cited

FOREIGN PATENT DOCUMENTS

| CN | 101237134 A | 8/2008 |
|---|---|---|
| CN | 101316033 A | 12/2008 |

(Continued)

OTHER PUBLICATIONS

Jing CN101673950 Translated; Mar. 2010.*

(Continued)

*Primary Examiner* — Jared Fureman
*Assistant Examiner* — James Evans
(74) *Attorney, Agent, or Firm* — Muncy, Geissler, Olds & Lowe, P.C.

(57) ABSTRACT

A multi-functional automatic switching circuit for direct current ice melting and a switching method thereof are provided. The automatic switching circuit comprises at least one sub-switching circuit. The sub-switching circuit comprises a six-pulse current converter (R) with no saturable reactor, six reactors (L1a, L1b, L1c, L2a, L2b, and L2c), three three-phase knife switches (Sac1, Sac2, and Sac3), and five single-phase knife switches (SV1, SV2, SV3, SV4, and SV5). The sub-switching circuits in series connection or parallel connection, four direct current side switching knife switches (Sdc1, Sdc2, Sdc3, and Sdc4), an isolation knife switch (K), a breaker (QF) and a control and protection system (CP) may form an automatic switching circuit for six-pulse or twelve-pulse direct current ice melting. The automatic switching circuit with no saturable reactor reduces noise during operation, achieves mutually automatic switching among modes of reactor switching, ice melting and test, and may complete the through-flow test of the automatic switching circuit without switching in a power transmission (Continued)

line, thereby solving the problem of daily operation and maintenance.

12 Claims, 10 Drawing Sheets

(56) References Cited

FOREIGN PATENT DOCUMENTS

| | | |
|---|---|---|
| CN | 101383494 A | 3/2009 |
| CN | 101673950 A | 3/2010 |
| EP | 1787383 B1 | 1/2009 |
| GB | 2418079 A * | 3/2006 ............ H02M 7/153 |

OTHER PUBLICATIONS

CN101237134 Translated; CN201274399—Translated; Aug. 2008.*
RU2316867—Translated and with clean figures from original Russian document; Aug. 2006.*
CN20128317—Translated and with Clean figures from original chinese document; Jul. 2009.*

* cited by examiner

MULTI-FUNCTIONAL DIRECT CURRENT ICE MELTING AUTOMATIC SWITCHING CIRCUIT AND SWITCHING METHOD THEREOF

FIELD OF THE INVENTION

The present invention relates to a multi-functional automatic switching circuit for direct current ice melting and a switching method thereof, and in particular, to a circuit able to achieve mutually automatic switching among a Thyristor Controlled Reactor (TCR), a Thyristor Switched Reactor (TSR), direct current ice melting and equivalent test functions, and a switching method thereof, which belong to an innovative technology applied by direct current ice melting for power transmission lines of high voltage grids and ultra-high voltage grids.

BACKGROUND OF THE INVENTION

Icing of power transmission lines caused by low temperature and rain or snow constitutes one of serious threats to power systems in a lot of countries. Severe icing will cause large-area power outage due to grid disconnection and tower collapse. It also leads to difficulties to resume power supply. The threat of ice disaster is always one technical difficulty fought by the industry of power systems for a long time.

In 1998, storm in North America had a serious effect on power grids in America and Canada, which caused large-area power outage. In 2005, low temperature and rain or snow caused large damage to Central China and North China Power Grids. In January-February, 2008, low temperature and rain or snow attacked south China, central China, and east China, which caused large-area and long-term outage of power transmission lines in Guizhou province, Hunan province, Guangdong province, Yunnan province, Guangxi province, Jiangxi province, and so on and further caused enormous losses to national economy and people's livelihood.

Many deicing/ice melting techniques were researched in industrial circles and academic circles to reduce the serious threat of more frequent ice disaster to the infrastructures of power systems. Wherein, the basic principle of direct current ice melting is as follows: alternating current electric power available from the power system is converted into direct current electric power by high-power rectifier devices, then the direct current electric power is input to wires of lines to be subjected to ice melting, the wires are heated with the action of the direct current to ensure that the ice covered thereon is melted, and therefore, the risks of line disconnection and tower collapse are eliminated. The direct current ice melting technique overcomes the limitation of alternating current ice melting, and inductive components of line resistance do not function during direct current ice melting, which greatly reduces the volume necessary for direct current ice melting and increases the ice melting efficiency. Further, during direct current ice melting, the direct current voltage is continuously adjustable, ice melting requirements of lines with different lengths may be met through adjusting the direct current output voltage, and no impedance matching is needed, thus the strict demand on operation modes of the power system is greatly lowered. Moreover, a direct current ice melting device located in a load-center substation may be used to melt ice covered on all the lines through the substation.

In the world, the former Soviet Union started using diode rectifier devices to melt ice since 1972, and later adopted silicon controlled rectifier devices. The direct current research institute of Russia successfully developed silicon controlled rectifier ice melting devices of two voltage classes: 14 kV (powered by a 11 kV alternating current bus) and 50 kV (powered by a 38.5 kV alternating current bus). The rated power of the 14 kV device is 14 MW, and the rated power of the 50 kV device is 50 MW. The 50 MW device was put into operation in a substation in 1994, and successfully applied to deicing of a 110 kV power transmission line of 315 km. After ice disaster in North America in 1998, the Quebec Electricity And Water Authority and the AREVAT&D company invested 25 millions EUR to cooperatively develop a direct current ice melting device, and one set of direct current ice melting device was mounted in the Lvis substation of the Quebec power grid, with the volume of 250 MW and the direct current output voltage of ±17.4 kV, and its design purpose is to melt ice covered on four 735 kV lines and two 315 kV lines. This device was subjected to field test in 2008, but so far has not been implemented in practical ice melting.

After ice disaster in 2008, power scientific and technical workers in China autonomously performed research and development of the direct current ice melting technique, and successfully researched and developed high-power direct current ice melting devices possessing completely independent intellectual property rights, mainly including many models such as a model with special rectifier transformers, a model with no special rectifier transformers, and a vehicle-mounted movable model, and further they were popularized and applied across the China, so far about 20 sets of direct current ice melting devices in total have been put into operation, where 19 sets of direct current ice melting devices have been provided in the China Southern Power Grid.

In January, 2009, the Guizhou Power Grid Corporation performed direct current ice melting on a 500 kV FuShi II line, a 220 kV FuJiu line, a 110 kV FuNiu line, and a 110 kV Shuishumei line, the Yunnan Power Grid Corporation performed direct current ice melting on a 220 kV ZhaoDa I line, and the Guangdong Power Grid Corporation performed direct current ice melting on a 110 kV TongMei line. In November, 2009, the Yunnan Power Grid Corporation performed direct current ice melting on a 110 kV DaZhong T line. Initial practical applications indicate that the direct current ice melting technique is an effective means of deicing the power grids.

In January, 2011, large-area icing attacked the China Southern Power Grid again, 19 sets of direct current ice melting devices which have been installed in the China Southern Power Grid all played a major role, and performed 217 times of direct current ice melting in total on the lines of above 110 kV, where more than 40 times of direct current ice melting on alternating current lines of 500 kV, which fully played a role of the direct current ice melting devices.

In view of the practical application effect of the direct current ice melting devices, the power grid enterprises in China started a new round of large-scale popularization and application since 2011 again.

However, it is found that in the practical application in the icing periods from 2009 to 2011, the existing direct current ice melting devices needs to be optimized in some aspects. For example, in one aspect, a saturable reactor of a converter has a large noise. In another aspect, current interruption occurs during short line ice melting. In a further aspect, the current-through test can only be done when the ice melting device is switched in the power transmission line, which is limited by the operation mode of power grids and also affects its normal operation.

SUMMARY OF THE INVENTION

In consideration of the above problem, an object of the present invention is to provide a multi-functional automatic switching circuit for direct current ice melting, which greatly reduces the noise during the operation of the direct current ice melting device, is able to achieve mutually automatic switching among multiple modes and complete the current-through test without being switched in the power transmission line, and effectively solves the problem of daily operation and maintenance.

A further object of the present invention is to provide a switching method of the multi-functional automatic switching circuit for direct current ice melting, which is simple to operate and convenient to use.

According to the technical solution of the present invention, a multi-functional automatic switching circuit for direct current ice melting is provided, including at least one sub-switching circuit composed of the following members, wherein the sub-switching circuit includes a six-pulse converter R with no saturable reactor, reactors L1a, L1b, and L1c, reactors L2a, L2b, and L2c, three-phase knife switches Sac1, Sac2, and Sac3, single-phase knife switches SV1, SV2, SV3, SV4, and SV5. The six-pulse converter R with no saturable reactor of the sub-switching circuit is connected to the reactors L1a, L1b, and L1c, and connected to the reactors L2a, L2b, and L2c. The reactors L2a, L2b, and L2c are correspondingly connected to the reactors L1c, L1b, and L1a through the three-phase knife switch Sac1, separately. The three-phase knife switch Sac3 is connected to one end of the six-pulse converter R at one end and short circuited at the other end. The three-phase knife switch Sac2 is connected to the reactors L2a, L2b, and L2c at one end and short circuited at the other end. The single-phase knife switch SV1 is connected, at two ends, to a negative pole of a valve arm V1 and a positive pole of a valve arm V4 of the six-pulse converter R, separately. The single-phase knife switch SV2 is connected, at two ends, to a negative pole of a valve arm V3 and a positive pole of a valve arm V6 of the six-pulse converter R, separately. The single-phase knife switch SV3 is connected, at two ends, to a negative pole of a valve arm V5 and a positive pole of a valve arm V2 of the six-pulse converter R, separately. The single-phase knife switch SV4 is connected between phases of the reactors L2b and L2c, and the single-phase knife switch SV5 is connected between phases of the reactors L2a and L2c.

The six-pulse converter R of the abovementioned sub-switching circuit does not have a saturable reactor.

The inductances of the reactors L1a, L1b, and L1c of the abovementioned sub-switching circuit are determined based on a thyristor current changing ratio di/dt and a short circuit current limit. The inductances of the reactors L1a, L1b, and L1c are 0-0.2 times those of the reactors L2a, L2b, and L2c. The rated currents of the reactors L1a, L1b, and L1c are designed as required for smoothing reactors in an ice melting mode. The rated currents of the reactors L2a, L2b, and L2c are designed as required for the TCR (thyristor controlled reactor) or TSR (thyristor switched reactor).

The abovementioned automatic switching circuit for six-pulse direct current ice melting includes a sub-switching circuit, direct current side switching knife switches Sdc1, Sdc2, Sdc3, and Sdc4, an isolation knife switch K, a breaker QF, and a control and protection system CP. The direct current side switching knife switches Sdc1 and Sdc2 are in parallel connection and then connected to a short circuited end of the three-phase knife switch Sac3 of the sub-switching circuit. The single-phase knife switches Sdc3 and Sdc4 are in parallel connection and then connected to a short circuited end of the three-phase knife switch Sac2 of the sub-switching circuit. The sub-switching circuit is connected to a 35 kV or 10 kV bus of a substation through the isolation knife switch K and the breaker QF. Position signals of the knife switches Sac1, Sac2, Sac3, K, SV1, SV2, SV3, SV4, SV5, Sdc1, Sdc2, Sdc3, and Sdc4 and of the breaker QF, alternating current side current signals Iva, Ivb, and Ivc, direct current side current signals Idp and Idn, and direct current side voltage signals Udp and Udn of a converter and a monitoring signal of the six-pulse converter R are communicated to the control and protection system CR The control and protection system CP sends on/off instructions to the knife switches and the breaker QF, and control/trigger instructions to the six-pulse converter R.

The abovementioned series-connection type automatic switching circuit for twelve-pulse direct current ice melting includes two sub-switching circuits in series connection, which are respectively a sub-switching circuit TC1 and a sub-switching circuit TC2, a Y/Y coupling transformer T1, a Y/Δ coupling transformer T2, direct current side switching knife switches Sdc1, Sdc2, Sdc3, and Sdc4, an isolation knife switch K, a breaker QF, and a control and protection system CR A middle point of a connection between the two sub-switching circuits is grounded, the sub-switching circuit TC1 is connected to the Y/Y coupling transformer T1, and the sub-switching circuit TC2 is connected to the Y/Δ coupling transformer T2. The six-pulse switching converters R with no saturable reactors of the sub-switching circuits TC1 and TC2 are connected through a short circuited end of the three-phase knife switch Sac3. The direct current side switching knife switches Sdc1 and Sdc2 are in parallel connection and then connected to a short circuited end of the three-phase knife switch Sac2 of the sub-switching circuit TC1. The single-phase knife switches Sdc3 and Sdc4 are in parallel connection and then connected to a short circuited end of the three-phase knife switch Sac2 of the sub-switching circuit TC2. The Y/Y coupling transformer T1 and the Y/Δ coupling transformer T2 are connected to a 35 kV or 10 kV or 220 kV bus of a substation through the isolation knife switch K and the breaker QF. Position signals of the knife switches Sac1, Sac2, Sac3, K, SV1, SV2, SV3, SV4, SV5, Sdc1, Sdc2, Sdc3, and Sdc4 and of the breaker QF, valve side current signals Iyva, Iyvb, Iyvc, Idva, Idvb, and Idvc, grid side currents Iya, Iyb, Iyc, Ida, Idb, and Idc, direct current side current signals Idp, Idn, and Idgn, and direct current side voltage signals Udp and Udn of rectifier transformers, and monitoring signals of the six-pulse converters R are communicated to the control and protection system CP. The control and protection system CP sends on/off instructions to the knife switches and the breaker QF, and control/trigger instructions to the six-pulse converters R.

The abovementioned parallel-connection type automatic switching circuit for direct current ice melting includes two sub-switching circuits in parallel connection, which are respectively a sub-switching circuit TC1 and a sub-switching circuit TC2, a Y/Y coupling transformer T1, a Y/Δ coupling transformer T2, direct current side switching knife switches Sdc1, Sdc2, Sdc3, and Sdc4, an isolation knife switch K, a breaker QF, and a control and protection system CP. The sub-switching circuit TC1 is connected to the Y/Y coupling transformer T1, and the sub-switching circuit TC2 is connected to the Y/Δ coupling transformer T2. A short circuited end of the three-phase knife switch Sac2 of the sub-switching circuit TC1 is connected to a short circuited end of the three-phase knife switch Sac3 of the sub-switching circuit TC2. A short circuited end of the three-phase knife switch Sac3 of the sub-switching circuit TC1 is connected to a short circuited end of the three-phase knife switch Sac3 of the sub-switching circuit TC2. The direct current side switching knife switches Sdc1 and Sdc2 are in parallel connection and then connected to a short circuited end of the three-phase knife switch Sac2 of the sub-switching circuit TC1. The side-phase knife switches Sdc3 and Sdc4 are in parallel connection and then connected to a short circuited end of the three-phase knife switch Sac2 of the sub-switching circuit TC2. The Y/Y coupling transformer T1 and the Y/Δ coupling transformer T2 are connected to a 35 kV or 10 kV or 220 kV bus of a substation through the isolation knife switch K and the breaker QF. Position signals of the knife switches Sac1, Sac2, Sac3, K, SV1, SV2, SV3, SV4, SV5, Sdc1, Sdc2, Sdc3, and Sdc4 and of the breaker QF, valve side current signals Iyva, Iyvb, Iyvc, Idva, Idvb, and Idvc and grid side currents Iya, Iyb, Iye, Ida, Idb, and Idc, direct current side current signals Idp and Idn, and direct current side voltage signals Udp and Udn of rectifier transformers, and monitoring signals of six-pulse converters R are communicated to the control and protection system CP. The control and protection system CP sends on/off instructions to the knife switches and the breaker QF, and control/trigger instructions to the six-pulse converters R.

When the abovementioned automatic switching circuit for six-pulse direct current ice melting operates in an ice melting mode, a direct current side is not grounded.

When the abovementioned series-connection type automatic switching circuit for twelve-pulse direct current ice melting operates in an ice melting mode, a connecting point of the two six-pulse converters R at the direct current side is directly grounded. The abovementioned series-connection type automatic switching circuit for twelve-pulse direct current ice melting keeps twelve pulses both when operating in the ice melting mode and in a TCR mode. The inductances of the reactors L1a, L1b, and L1c of the abovementioned series-connection type automatic switching circuit for twelve-pulse direct current ice melting may be 0, that is, the reactors L1a, L1b, and L1c are not provided.

When the abovementioned parallel-connection type automatic switching circuit for twelve-pulse direct current ice melting operates in an ice melting manner, a direct current side is not grounded. The abovementioned parallel-connection type automatic switching circuit for twelve-pulse direct current ice melting keeps twelve pulses both when operating in the ice melting mode and in a TCR mode. The inductances of the reactors L1a, L1b, and L1c of the abovementioned parallel-connection type automatic switching circuit for twelve-pulse direct current ice melting may be 0, that is, the reactors L1a, L1b, and L1c are not provided.

A switching method of a multi-functional automatic switching circuit is provided by the present invention, including the following switching modes:

1) a one-go and one-return direct current ice melting mode, that is, A and B phase lines are in series connection to melt ice, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1 and Sdc2 are turned on, the direct current side switching knife switches Sdc3 and Sd4 are turned off, and wherein the alternating current side isolation knife switch K and the breaker QF are turned on;

2) a two-go and one-return direct current ice melting mode, that is, A and B phase lines are in parallel connection and then in series connection with a C phase line to melt ice, wherein the three-phase knife switches Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1, Sdc2 and Sdc4 are turned on, the direct current side switching knife switch Sdc3 is turned off, and wherein the alternating current side isolation knife switch K and the breaker QF are turned on;

3) an open circuit test mode, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1, Sdc2, Sdc3 and Sdc4 are turned off, and wherein the alternating current side isolation knife switch K and the breaker QF are turned on;

4) a zero power test mode, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1 and Sdc4 are turned off, the direct current side switching knife switches Sdc2 and Sdc3 are turned on, and wherein the alternating current side isolation knife switch K and the breaker QF are turned on;

5) a TCR mode, wherein the three-phase knife switch Sac1 is turned on, the three-phase knife switches Sac2 and Sac3 are turned off, the single-phase knife switches SV1, SV2, and SV3 are turned on, the single-phase knife switches SV4 and SV5 are turned off, the direct current side switching knife switches Sdc1, Sdc2, Sdc3 and Sdc4 are turned off, and wherein the alternating current side isolation knife switch K and the breaker QF are turned on; and 6) a TSR mode, wherein the three-phase knife switch Sac1 is turned on, the three-phase knife switches Sac2 and Sac3 are turned off, the single-phase knife switches SV1, SV2, and SV3 are turned on, the single-phase knife switches SV4 and SV5 are turned off, the direct current side switching knife switches Sdc1, Sdc2, Sdc3 and Sdc4 are turned off, and wherein the alternating current side isolation knife switch K and the breaker QF are turned on.

The abovementioned switching method of the multi-functional automatic switching circuit for direct current ice melting is characterized in that in either of the one-go and one-return direct current ice melting mode, the two-go and one-return direct current ice melting mode, the open circuit test mode and the zero power test mode, the reactors L1a, L1b and L1c function as commutation reactors, and the reactors L2a, L2b and L2c function as smoothing reactors.

The abovementioned switching method of the multi-functional automatic switching circuit for direct current ice melting is characterized in that in the TCR mode, the reactors L1a, L1b and L1c and the reactors L2a, L2b and L2c function as phase controlled reactors, and in the TSR mode, the reactors L1a, L1b and L1c and the reactors L2a, L2b and L2c function as switched reactors.

As a result of adopting the structure of the converter with the smoothing reactor, the current-through test can be completed without enabling the direct current ice melting device to be switched in the power transmission line, and the direct current ice melting device can be switched to operate in the TCR or TSR when there is no necessity to melt ice. The converter with no saturable reactor of the direct current ice melting device greatly reduces the noise during the operation of the direct current ice melting device. By providing the isolation knife switch, the present invention is able to achieve mutually automatic switching among the TCR mode, the direct current ice melting mode and equivalent test modes thereof, and other modes. The current-through test can be completed without enabling the direct current ice melting device to be switched in the power transmission line, and the problem of daily operation and maintenance can be effectively solved. The circuit able to achieve mutually automatic switching among TCR, TSR, direct current ice melting and equivalent test functions thereof, provided by present invention, is suitable for ice melting of high-voltage and ultra-high voltage power transmission lines. The multi-functional automatic switching circuit for direct current ice melting, provided by the present invention, is reasonable in design, and is convenient and practical. The switching method of the multi-functional automatic switching circuit for direct current ice melting, provided by the present invention, is simple to operate and easy to use.

BRIEF DESCRIPTION OF THE DRAWINGS

The following will further describe the patent for invention in detail with reference to the accompanying drawing and specific embodiments.

In FIG. 1 to FIG. 10, Uab, Ubc and Uca are three phases of voltages of the 10 kV or 35 kV or 220 kV bus. Iva, Ivb, Ivc, Iyva, Iyvb, Iyvc, Idva, Idvb, and Idvc are alternating current side currents of a converter. Iya, Iyb, Iyc, Ida, Idb, and Idc are grid side currents of rectifier transformers. Idp, Idn, and Idgn are direct current side currents. Udp and Udn are direct current side voltages. K is an alternating current side isolation knife switch. QF is an alternating current side breaker. K1 is an alternating current side isolation knife switch. QF1 is an alternating current side breaker. F is a filter bank.

DETAILED DESCRIPTION OF EMBODIMENTS

Embodiments

Figure 1:
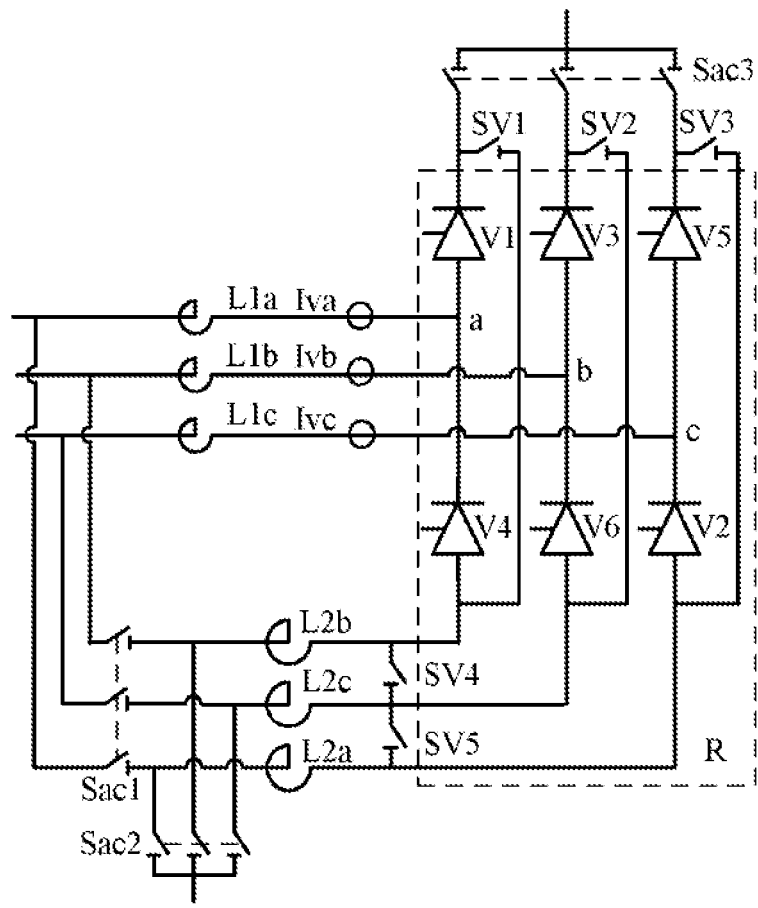
FIG. 1 shows a sub-switching circuit of a multi-functional automatic switching circuit for direct current ice melting according to the present invention.

The structural schematic diagrams of the present invention are shown in FIG. 1 to FIG. 10. According to the present invention, a multi-functional automatic switching circuit for direct current ice melting is provided, including at least one sub-switching circuit, as shown in FIG. 1, composed of the following members, wherein the sub-circuiting circuit includes a six-pulse converter R with no saturable reactor, reactors L1a, L1b, and L1c, reactors L2a, L2b, and L2c, three-phase knife switches Sac1, Sac2, and Sac3, and single-phase knife switches SV1, SV2, SV3, SV4, and SV5. The six-pulse converter R with no saturable reactor of the sub-switching circuit is connected to the reactors L1a, L1b, and L1c, and connected to the reactors L2a, L2b, and L2c. The reactors L2a, L2b, and L2c are correspondingly connected to the reactors L1c, L1b, and L1a through the three-phase knife switch Sac1, separately. The three-phase knife switch Sac3 is connected to one end of the six-pulse converter R with no saturable reactor at one end and short circuited at the other end. The three-phase knife switch Sac2 is connected to the reactors L2a, L2b, and L2c at one end and short circuited at the other end. The single-phase knife switch SV1 is connected, at two ends, to a negative pole of a valve arm V1 and a positive pole of a valve arm V4 of the six-pulse converter R, separately. The single-phase knife switch SV2 is connected, at two ends, to a negative pole of a valve arm V3 and a positive pole of a valve arm V6 of the six-pulse converter R, separately. The single-phase knife switch SV3 is connected, at two ends, to a negative pole of a valve arm V5 and a positive pole of a valve arm V2 of the six-pulse converter R, separately. The single-phase knife switch SV4 is connected between phases of the reactors L2b and L2c, and the single-phase knife switch SV5 is connected between phases of the reactors L2a and L2c.

Figure 2:
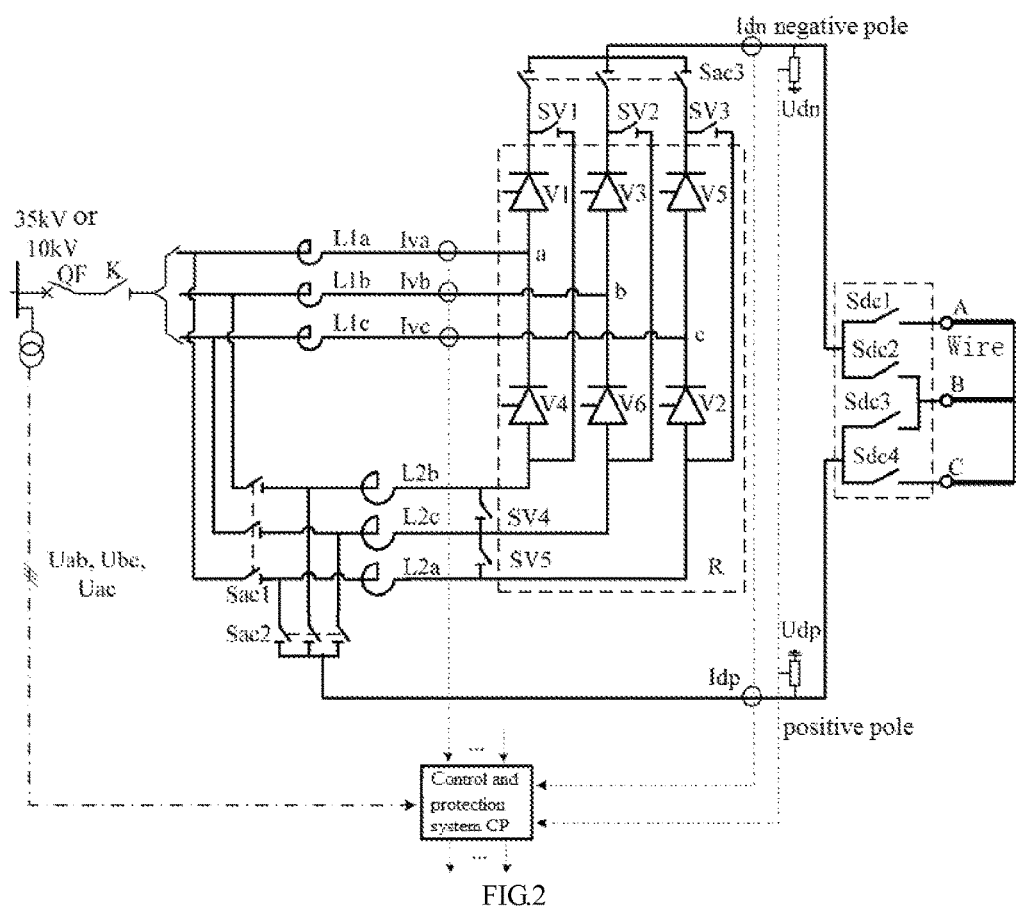
FIG. 2 shows a principle of an automatic switching circuit for six-pulse direct current ice melting comprising a sub-switching circuit according to the present invention.

The abovementioned automatic switching circuit for six-pulse direct current ice melting, as shown in FIG. 2, includes a sub-switching circuit, direct current side switching knife switches Sdc1, Sdc2, Sdc3, and Sdc4, an isolation knife switch K, a breaker QF, and a control and protection system CP. The direct current side switching knife switches Sdc1 and Sdc2 are in parallel connection and then connected to the short circuited end of the three-phase knife switch Sac3 of the sub-switching circuit. The single-phase knife switches Sdc3 and Sdc4 are in parallel connection and then connected to the short circuited end of the three-phase knife switch Sac2 of the sub-switching circuit. The sub-switching circuit is connected to a 35 kV or 10 kV bus of a substation through the isolation knife switch K and the breaker QF. Position signals of the knife switches Sac1, Sac2, Sac3, K, SV1, SV2, SV3, SV4, SV5, Sdc1, Sdc2, Sdc3, and Sdc4 and of the breaker QF, alternating current side current signals Iva, Ivb, and Ivc, direct current side current signals Idp and Idn, and direct current side voltage signals Udp and Udn of the converter, and a monitoring signal of a six-pulse converter R are communicated to the control and protection system CP. The control and protection system CP sends on/off instructions to the knife switches and the breaker QF, and control/trigger instructions to the six-pulse converter R.

Figure 3:
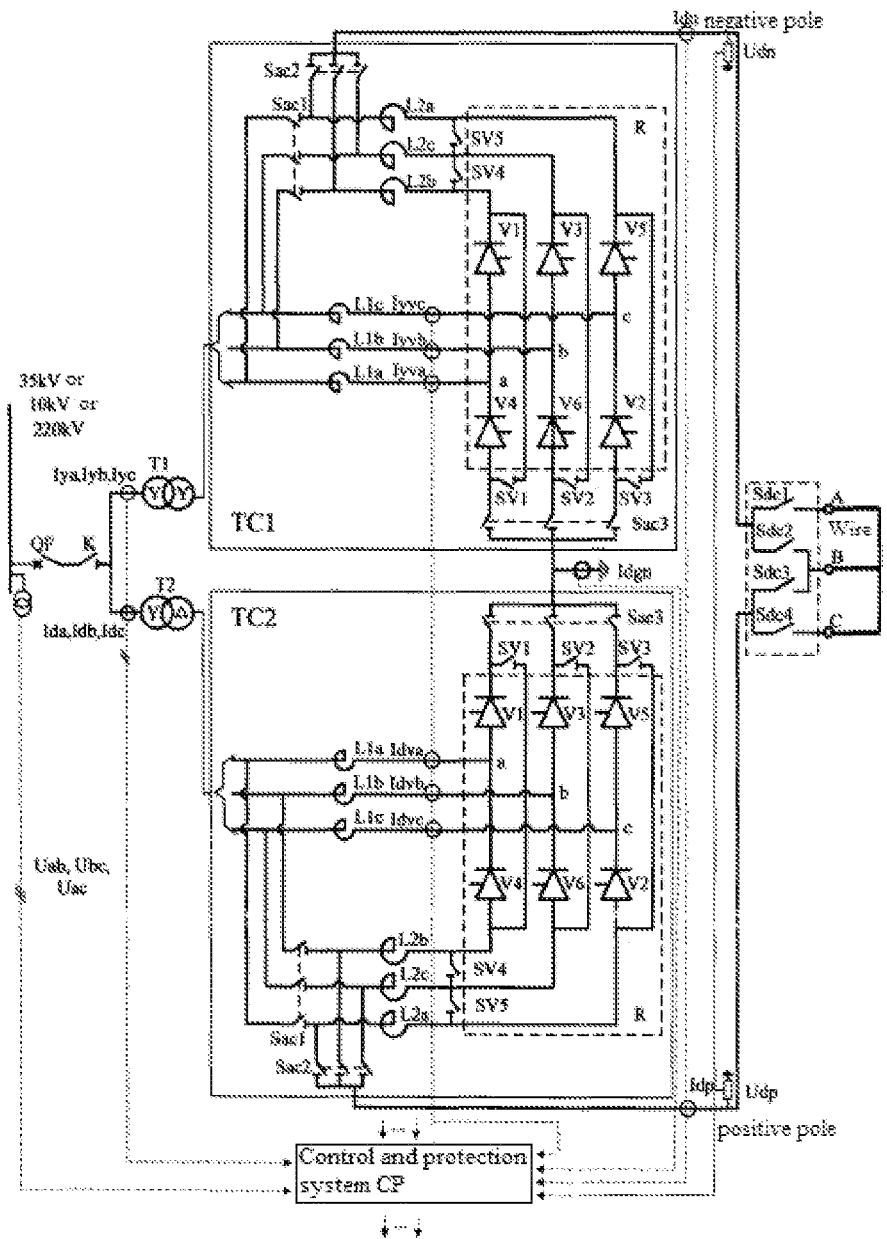
FIG. 3 shows a principle of a series-connection type automatic switching circuit for twelve-pulse direct current ice melting comprising two sub-switching circuits in series connection according to the present invention.

The abovementioned series-connection type automatic switching circuit for twelve-pulse direct current ice melting, as shown in FIG. 3, includes two sub-switching circuits in series connection, which are respectively a sub-switching circuit TC1 and a sub-switching circuit TC2, a Y/Y coupling transformer T1, a Y/Δ coupling transformer T2, direct current side switching knife switches Sdc1, Sdc2, Sdc3, and Sdc4, an isolation knife switch K, a breaker QF, and a control and protection system CP. A middle point of a connection between the two sub-switching circuits is grounded, the sub-switching circuit TC1 is connected to the Y/Y coupling transformer T1, and the sub-switching circuit TC2 is connected to the Y/Δ coupling transformer T2. The six-pulse converters R with no saturable reactors of the sub-switching circuits TC1 and TC2 are connected through a short circuited end of the three-phase knife switch Sac3. The direct current side switching knife switches Sdc1 and Sdc2 are in parallel connection and then connected to a short circuited end of the three-phase knife switch Sac2 of the sub-switching circuit TC1. The single-phase knife switches Sdc3 and Sdc4 are in parallel connection and then connected to a short circuited end of the three-phase knife switch Sac2 of the sub-switching circuit TC2. The Y/Y coupling transformer T1 and the Y/Δ coupling transformer T2 are connected to a 35 kV or 10 kV or 220 kV bus of a substation through the isolation knife switch K and the breaker QF. Position signals of the knife switches Sac1, Sac2, Sac3, K, SV1, SV2, SV3, SV4, SV5, Sdc1, Sdc2, Sdc3, and Sdc4 and of the breaker QF, valve side current signals Iyva, Iyvb, Iyvc, Idva, Idvb, and Idvc, grid side currents Iya, Iyb, Iyc, Ida, Idb, and Idc, direct current side current signals Idp, Idn, and Idgn, and direct current side voltage signals Udp and Udn of rectifier transformers and monitoring signals of the six-pulse converters R are communicated to the control and protection system CP. The control and protection system CP sends on/off instructions to the knife switches and the breaker QF, and control/trigger instructions to the six-pulse converters R.

Figure 4:
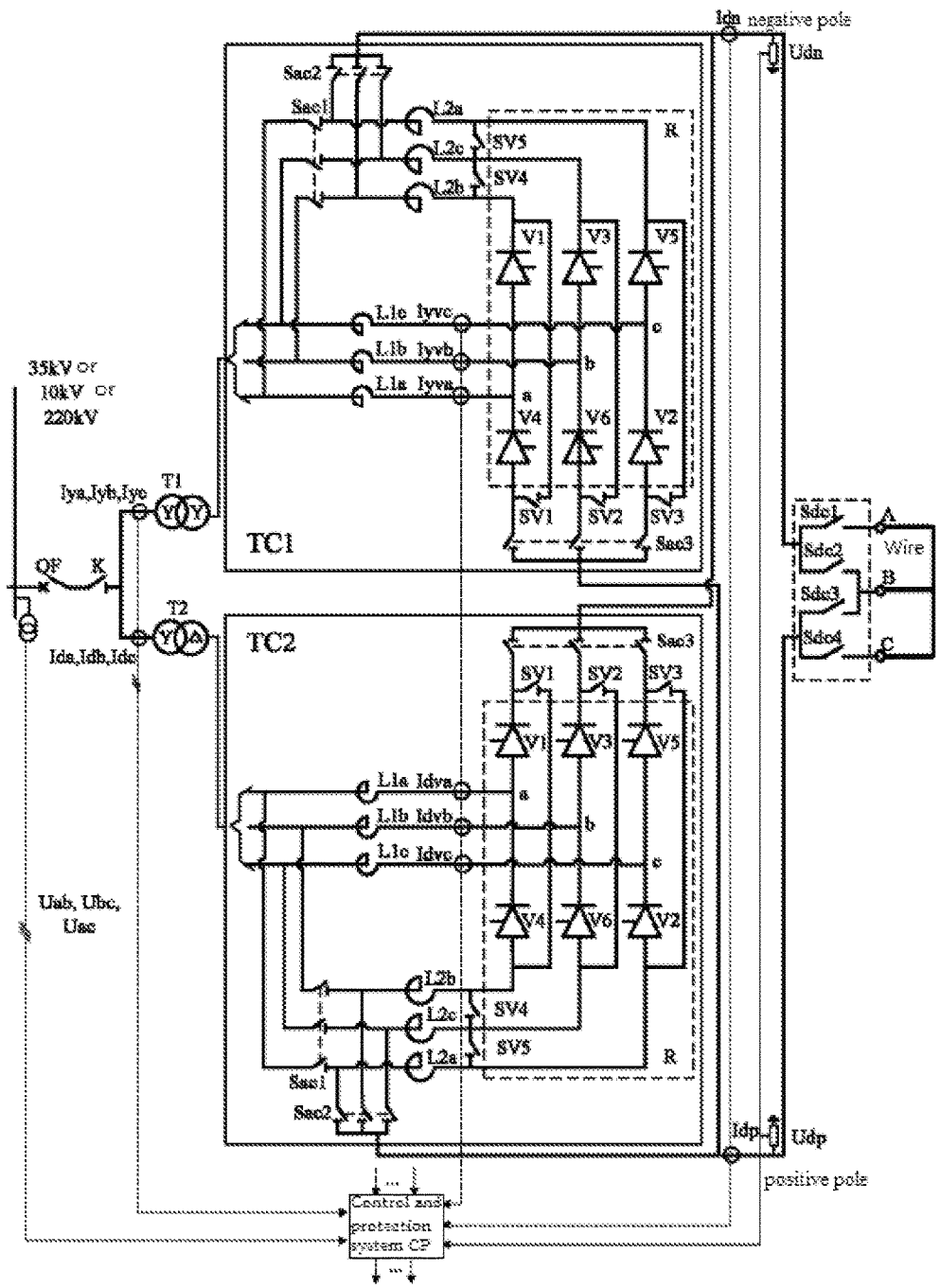
FIG. 4 shows a principle of a parallel-connection type automatic switching circuit for twelve-pulse direct current ice melting comprising two sub-switching circuits in parallel connection according to the present invention.

The abovementioned parallel-connection type automatic switching circuit for twelve-pulse direct current melting, as shown in FIG. 4, includes two sub-switching circuits in parallel connection, which are respectively a sub-switching circuit TC1 and a sub-switching circuit TC2, a Y/Y coupling transformer T1, a Y/Δ coupling transformer T2, direct current side switching knife switches Sdc1, Sdc2, Sdc3, and Sdc4, an isolation knife switch K, a breaker QF, and a control and protection system CP. The sub-switching circuit TC1 is connected to the Y/Y coupling transformer T1, and the sub-switching circuit TC2 is connected to the Y/Δ coupling transformer T2. A short circuited end of the three-phase knife switch Sac2 of the sub-switching circuit TC1 is connected to a short circuited end of the three-phase knife switch Sac3 of the sub-switching circuit TC2. A short circuited end of the three-phase knife switch Sac3 of the sub-switching circuit TC1 is connected to a short circuited end of the three-phase knife switch Sac3 of the sub-switching circuit TC2. The direct current side switching knife switches Sdc1 and Sdc2 are in parallel connection and then connected to a short circuited end of the three-phase knife switch Sac2 of the sub-switching circuit TC1. The single-phase knife switches Sdc3 and Sdc4 are in parallel connection and then connected to a short circuited end of the three-phase knife switch Sac2 of the sub-switching circuit TC2. The Y/Y coupling transformer T1 and the Y/Δ coupling transformer T2 are connected to a 35 kV or 10 kV or 220 kV bus of a substation through the isolation knife switch K and the breaker QF. Position signals of the knife switches Sac1, Sac2, Sac3, K, SV1, SV2, SV3, SV4, SV5, Sdc1, Sdc2, Sdc3, and Sdc4 and of the breaker QF, valve side current signals Iyva, Iyvb, Iyvc, Idva, Idvb, and Idvc and grid side currents Iya, Iyb, Iyc, Ida, Idb, and Idc, direct current side current signals Idp and Idn, and direct current side voltage signals Udp and Udn of rectifier transformers and monitoring signals of the six-pulse converters R are communicated to the control and protection system CP. The control and protection system CP sends on/off instructions to the knife switches and the breaker QF, and control/trigger instructions to the six-pulse converters R.

Embodiment 1

Figure 5:
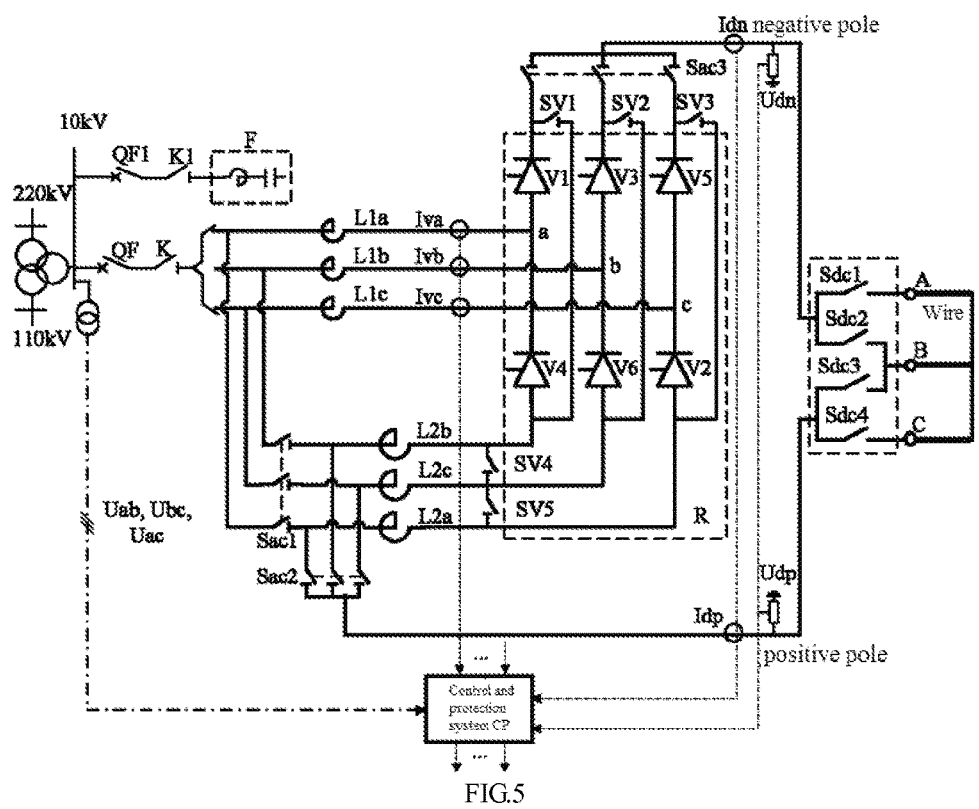
FIG. 5 shows an embodiment of an automatic switching circuit for six-pulse direct current ice melting comprising a sub-switching circuit connected to the 10 kV side of a 220 kV main transformer according to the present invention.

Referring to FIG. 5, in this embodiment, the abovementioned automatic switching circuit for six-pulse direct current ice melting includes a sub-switching circuit. The sub-switching circuit is connected to the 10 kV side of a 220 kV main transformer through an alternating current side isolation knife switch K and a breaker QF. A filter bank F is used to carry out reactive compensation and harmonic suppression. The sub-switching circuit is connected to a 10 kV bus through an isolation knife switch K1 and a breaker QF1.

Three phases of voltages Uab, Ubc, and Uca of the 10 kV bus, alternating current side currents Iva, Ivb, and Ivc, direct current side currents Idp and Idn, and direct current side voltages Udp and Udn of the converter, a monitoring signal of the converter, monitoring signals of the knife switches, monitoring signals of the breakers, and the like are communicated to the control and protection system CR The control and protection system CP sends control instructions to the knife switches, the breakers, and the converter. The implementation solutions of a TCR mode, a TSR mode, a direct current ice melting mode and equivalent test modes thereof, and other modes are as follows:

1) a one-go and one-return direct current ice melting mode, that is, A and B phase lines are in series connection to melt ice, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1 and Sdc2 are turned on, the direct current side switching knife switches Sdc3 and Sd4 are turned off, and the alternating current isolation knife switch K and the breaker QF are turned on;

2) a two-go and one-return direct current ice melting mode, that is, A and B phase lines are in parallel connection and then in series connection with a C phase line to melt ice, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1, Sdc2 and Sdc4 are turned on, the direct current side switching knife switch Sdc3 is turned off, and the alternating current side isolation knife switch K and the breaker QF are turned on;

3) an open circuit test mode, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1, Sdc2, Sdc3 and Sdc4 are turned off, and the alternating current side isolation knife switch K and the breaker QF are turned on;

4) a zero power test mode, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1 and Sdc4 are turned off, the direct current side switching knife switches Sdc2 and Sdc3 are turned on, and the alternating current side isolation knife switch K and the breaker QF are turned on;

5) a TCR mode, wherein the three-phase knife switch Sac1 is turned on, the three-phase knife switches Sac2 and Sac3 are turned off, the single-phase knife switches SV1, SV2, and SV3 are turned on, the single-phase knife switches SV4 and SV5 are turned off, the direct current side switching knife switches Sdc1, Sdc2, Sdc3 and Sdc4 are turned off, and the alternating current side isolation knife switch K and the breaker QF are turned on; and 6) a TSR mode, wherein the three-phase knife switch Sac1 is turned on, the three-phase knife switches Sac2 and Sac3 are turned off, the single-phase knife switches SV1, SV2, and SV3 are turned on, the single-phase knife switches SV4 and SV5 are turned off, the direct current side switching knife switches Sdc1, Sdc2, Sdc3 and Sdc4 are turned off, and the alternating current side isolation knife switch K and the breaker QF are turned on.

Embodiment 2

Figure 6:
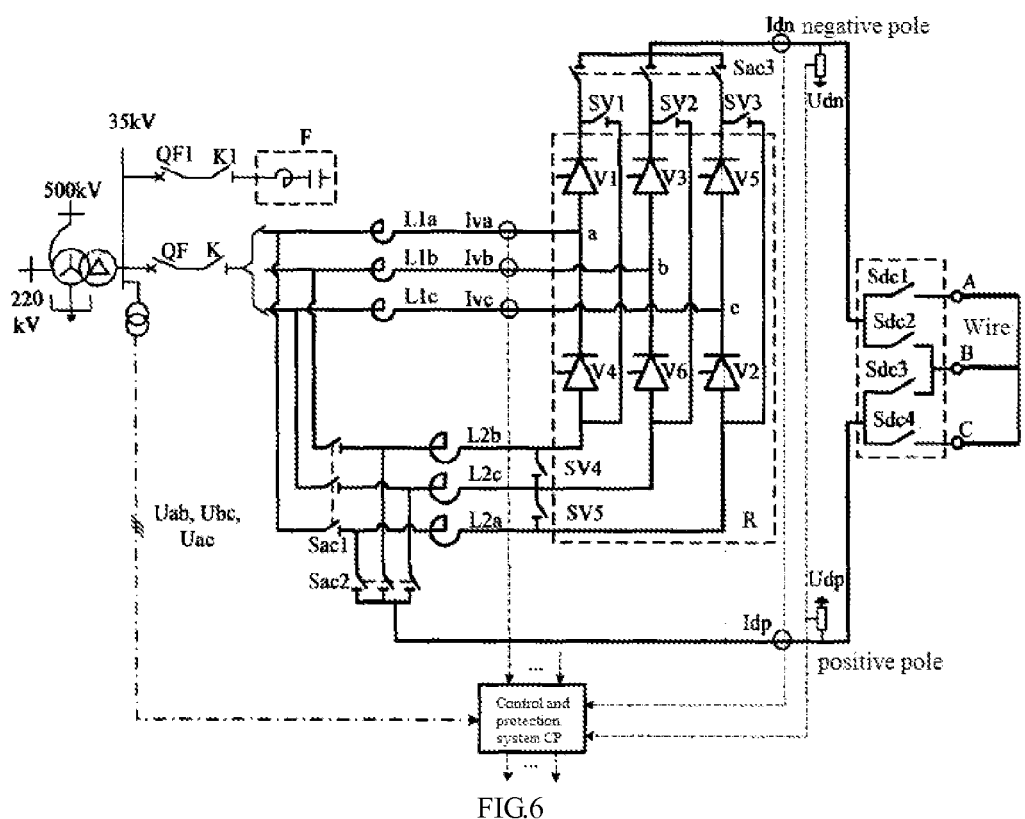
FIG. 6 shows an embodiment of an automatic switching circuit for six-pulse direct current ice melting comprising a sub-switching circuit connected to the 35 kV side of a 220 kV main transformer according to the present invention.

Referring to FIG. 6, in this embodiment, the abovementioned automatic switching circuit for six-pulse direct current ice melting includes a sub-switching circuit. The sub-switching circuit is connected to the 35 kV side of a 500 kV main transformer through an alternating current side isolation knife switch K and a breaker QF. A filter bank F is used to carry out reactive compensation and harmonic suppression, and is connected to a 35 kV bus through an isolation knife switch K1 and a breaker QF1.

Three phases of voltages Uab, Ubc, and Uca of the 35 kV bus, and alternating current side currents Iva, Ivb, and Ivc, direct current side currents Idp and Idn, and direct current side voltages Udp and Udn of the converter, a monitoring signal of the converter, monitoring signals of the knife switches, and monitoring signals of the breakers, and the like are communicated to a control and protection system CP. The control and protection system CP sends control instructions to the knife switches, the breakers, and the converter. The implementation solutions of a TCR mode, a TSR mode, a direct current ice melting mode and equivalent test modes thereof, and other modes are as follows:

1) a one-go and one-return direct current ice melting mode, that is, A and B phase lines are in series connection to melt ice, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1 and Sdc2 are turned on, the direct current side switching knife switches Sdc3 and Sd4 are turned off, and the alternating current side isolation knife switch K and the breaker QF are turned on;

2) a two-go and one-return direct current ice melting mode, that is, A and B phase lines are in parallel connection and then in series connection with a C phase line to melt ice, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1, Sdc2 and Sdc4 are turned on, the direct current side switching knife switch Sdc3 is turned off, and the alternating current side isolation knife switch K and the breaker QF are turned on;

3) an open circuit test mode, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1, Sdc2, Sdc3 and Sdc4 are turned off, and the alternating current side isolation knife switch K and the breaker QF are turned on;

4) a zero power test mode, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1 and Sdc4 are turned off, the direct current side switching knife switches Sdc2 and Sdc3 are turned on, and the alternating current side isolation knife switch K and the breaker QF are turned on;

5) a TCR mode, wherein the three-phase knife switch Sac1 is turned on, the three-phase knife switches Sac2 and Sac3 are turned off, the single-phase knife switches SV1, SV2, and SV3 are turned on, the single-phase knife switches SV4 and SV5 are turned off, the direct current side switching knife switches Sdc1, Sdc2, Sdc3 and Sdc4 are turned off, and the alternating current side isolation knife switch K and the breaker QF are turned on; and 6) a TSR mode, wherein the three-phase knife switch Sac1 is turned on, the three-phase knife switches Sac2 and Sac3 are turned off, the single-phase knife switches SV1, SV2, and SV3 are turned on, the single-phase knife switches SV4 and SV5 are turned off, the direct current side switching knife switches Sdc1, Sdc2, Sdc3 and Sdc4 are turned off, and the alternating current side isolation knife switch K and the breaker QF are turned on.

Embodiment 3

Figure 7:
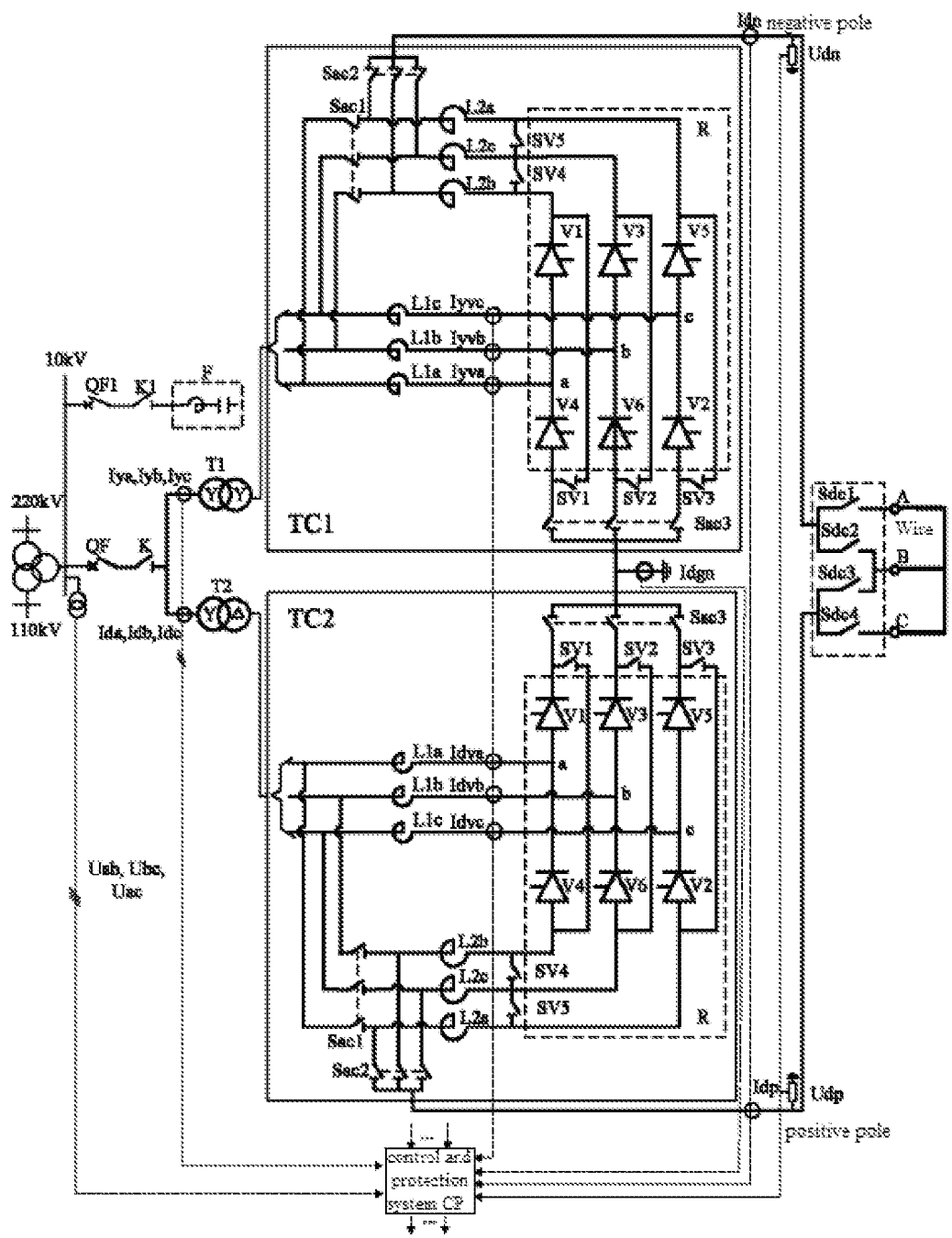
FIG. 7 shows an embodiment of a series-connection type automatic switching circuit for twelve-pulse direct current ice melting comprising two sub-switching circuits in series connection connected to the 10 kV side of a 220 kV main transformer according to the present invention.

Referring to FIG. 7, in this embodiment, the abovementioned series-connection type automatic switching circuit for twelve-pulse direct current ice melting includes two sub-switching circuits which are respectively a sub-switching circuit TC1 and a sub-switching circuit TC2. The sub-switching circuit TC1 and the sub-switching circuit TC2 are connected to the 10 kV side of a 220 kV main transformer through three-phase double-winding rectifier transformers T1 and T2, an isolation knife switch K and a breaker QF. A filter bank F is used to carry out reactive compensation and harmonic suppression, and is connected to a 10 kV bus through an isolation knife switch K1 and a breaker QF1.

Three phases of voltages Uab, Ubc, and Uca of the 10 kV bus, valve side currents Iyva, Iyvb, Iyvc, Idva, Idvb, and Idvc, grid side currents Iya, Iyb, Iyc, Ida, Idb, and Idc, direct current side currents Idp, Idn, and Idgn, and direct current side voltages Udp and Udn of rectifier transformers, a monitoring signal of the converter, monitoring signals of knife switches, monitoring signals of the breakers, and the like are communicated to a control and protection system CP. The control and protection system CP sends control instructions to the knife switches, the breakers, and the converter. The implementation solutions of a TCR mode, a TSR mode, a direct current ice melting mode and equivalent test modes thereof, and other modes are as follows:

1) a one-go and one-return direct current ice melting mode, that is, A and B phase lines are in series connection to melt ice, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1 and Sdc2 are turned on, the direct current side switching knife switches Sdc3 and Sd4 are turned off, and the alternating current side isolation knife switch K and the breaker QF are turned on;

2) a two-go and one-return direct current ice melting mode, that is, A and B phase lines are in parallel connection and then in series connection with a C phase line to melt ice, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1, Sdc2 and Sdc4 are turned on, the direct current side switching knife switch Sdc3 is turned off, and the alternating current side isolation knife switch K and the breaker QF are turned on;

3) an open circuit test mode, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1, Sdc2, Sdc3 and Sdc4 are turned off, and the alternating current side isolation knife switch K and the breaker QF are turned on;

4) a zero power test mode, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1 and Sdc4 are turned off, the direct current side switching knife switches Sdc2 and Sdc3 are turned on, and the alternating current side isolation knife switch K and the breaker QF are turned on;

5) a TCR mode, wherein the three-phase knife switch Sac1 is turned on, the three-phase knife switches Sac2 and Sac3 are turned off, the single-phase knife switches SV1, SV2, and SV3 are turned on, the single-phase knife switches SV4 and SV5 are turned off, the direct current side switching knife switches Sdc1, Sdc2, Sdc3 and Sdc4 are turned off, and the alternating current side isolation knife switch K and the breaker QF are turned on; and 6) a TSR mode, wherein the three-phase knife switch Sac1 is turned on, the three-phase knife switches Sac2 and Sac3 are turned off, the single-phase knife switches SV1, SV2, and SV3 are turned on, the single-phase knife switches SV4 and SV5 are turned off, the direct current side switching knife switches Sdc1, Sdc2, Sdc3 and Sdc4 are turned off, and the alternating current side isolation knife switch K and the breaker QF are turned on.

Embodiment 4

Figure 8:
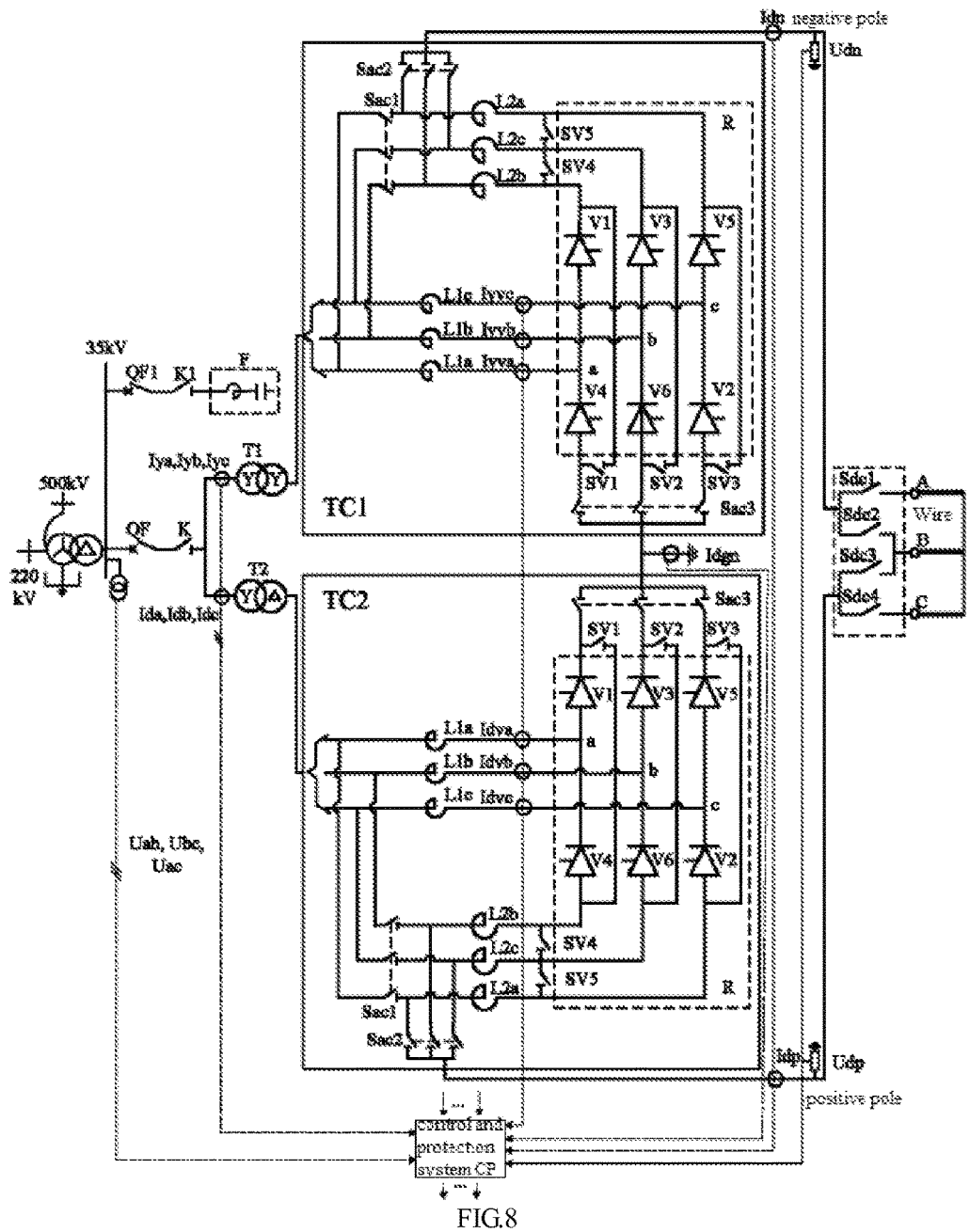
FIG. 8 shows an embodiment of a series-connection type automatic switching circuit for twelve-pulse direct current ice melting comprising two sub-switching circuits in series connection connected to the 35 kV side of a 220 kV main transformer according to the present invention.

Referring to FIG. 8, in this embodiment, the abovementioned series-connection type automatic switching circuit for twelve-pulse direct current ice melting includes two sub-switching circuits which are respectively a sub-switching circuit TC1 and a sub-switching circuit TC2. The sub-switching circuit TC1 and the sub-switching circuit TC2 are connected to the 35 kV side of a 500 kV main transformer through three-phase double-winding rectifier transformers T1 and T2, an isolation knife switch K and a breaker QF. A filter bank F is used to carry out reactive compensation and harmonic suppression and is connected to a 35 kV bus through an isolation knife switch K1 and a breaker QF1.

Three phases of voltages Uab, Ubc, and Uca of the 35 kV bus, valve side currents Iyva, Iyvb, Iyvc, Idva, Idvb, and Idvc, grid side currents Iya, Iyb, Iyc, Ida, Idb, and Idc, direct current side currents Idp, Idn, and Idgn, and direct current side voltage signals Udp and Udn of the rectifier transformers, a monitoring signal of the converter, monitoring signals of knife switches, monitoring signals of the breakers, and the like are communicated to a control and protection system CP. The control and protection system CP sends control instructions to the knife switches, the breakers, and the converter. The implementation solutions of a TCR mode, a TSR mode, a direct current ice melting mode and equivalent test modes thereof, and other modes are as follows:

1) a one-go and one-return direct current ice melting mode, that is, A and B phase lines are in series connection to melt ice, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1 and Sdc2 are turned on, the direct current side switching knife switches Sdc3 and Sd4 are turned off, and the alternating current side isolation knife switch K and the breaker QF are turned on;

2) a two-go and one-return direct current ice melting mode, that is, A and B phase lines are in parallel connection and then in series connection with a C phase line to melt ice, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1, Sdc2 and Sdc4 are turned on, the direct current side switching knife switch Sdc3 is turned off, and the alternating current side isolation knife switch K and the breaker QF are turned on;

3) an open circuit test mode, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1, Sdc2, Sdc3 and Sdc4 are turned off, and the alternating current side isolation knife switch K and the breaker QF are turned on;

4) a zero power test mode, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1 and Sdc4 are turned off, the direct current side switching knife switches Sdc2 and Sdc3 are turned on, and the alternating current side isolation knife switch K and the breaker QF are turned on;

5) a TCR mode, wherein the three-phase knife switch Sac1 is turned on, the three-phase knife switches Sac2 and Sac3 are turned off, the single-phase knife switches SV1, SV2, and SV3 are turned on, the single-phase knife switches SV4 and SV5 are turned off, the direct current side switching knife switches Sdc1, Sdc2, Sdc3 and Sdc4 are turned off, and the alternating current side isolation knife switch K and the breaker QF are turned on; and 6) a TSR mode, wherein the three-phase knife switch Sac1 is turned on, the three-phase knife switches Sac2 and Sac3 are turned off, the single-phase knife switches SV1, SV2, and SV3 are turned on, the single-phase knife switches SV4 and SV5 are turned off, the direct current side switching knife switches Sdc1, Sdc2, Sdc3 and Sdc4 are turned off, and the alternating current side isolation knife switch K and the breaker QF are turned on.

Embodiment 5

Figure 9:
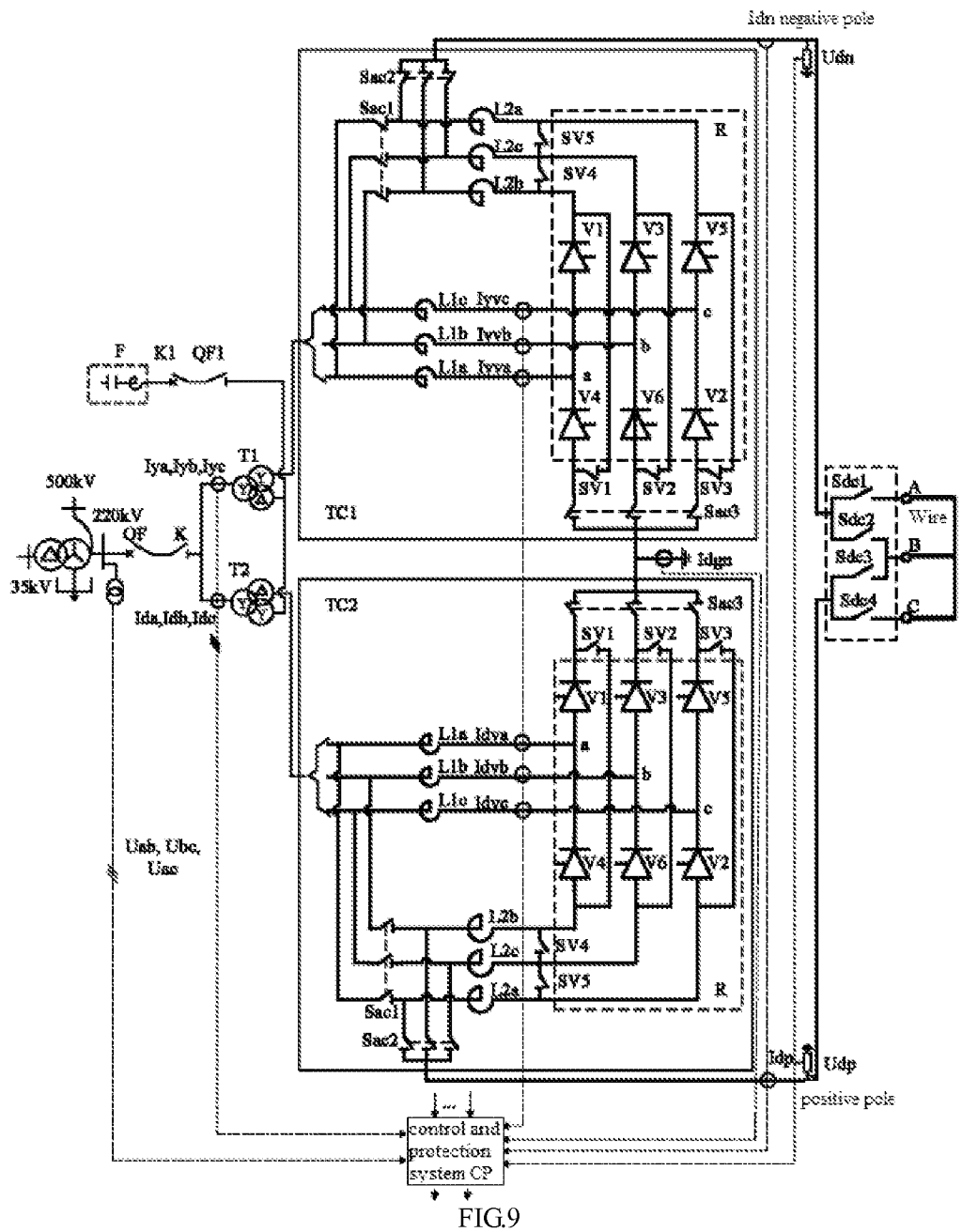
FIG. 9 shows an embodiment of a series-connection type automatic switching circuit for twelve-pulse direct current ice melting comprising two sub-switching circuits in series connection connected to the 220 kV side of a 500 kV main transformer according to the present invention.

Referring to FIG. 9, in this embodiment, the abovementioned series-connection type automatic switching circuit for twelve-pulse direct current ice melting includes two sub-switching circuits which are respectively a sub-switching circuit TC1 and a sub-switching circuit TC2. The sub-switching circuit TC1 and the sub-switching circuit TC2 are connected to the 220 kV side of a 500 kV main transformer through three-phase three-winding rectifier transformers T1 and T2, an isolation knife switch K and a breaker QF. A filter bank F is used to carry out reactive compensation and harmonic suppression and is connected to a third winding of the rectifier transformers though an isolation knife switch K1 and a breaker QF1.

Three phases of voltages Uab, Ubc, and Uca of the 220 kV bus, valve side currents Iyva, Iyvb, Iyvc, Idva, Idvb, and Idvc, grid side currents Iya, Iyb, Iyc, Ida, Idb, and Idc, direct current side currents Idp, Idn, and Idgn, and direct current side voltages Udp and Udn of the rectifier transformers, a monitoring signal of the converter, monitoring signals of knife switches, monitoring signals of the breakers, and the like are communicated to a control and protection system CP. The control and protection system CP sends control instructions to the knife switches, the breakers, and the converter. The implementation solutions of a TCR mode, a TSR mode, a direct current ice melting mode and equivalent test modes thereof, and other modes are as follows:

1) a one-go and one-return direct current ice melting mode, that is, A and B phase lines are in series connection to melt line, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1 and Sdc2 are turned on, the direct current side switching knife switches Sdc3 and Sd4 are turned off, and the alternating current side isolation knife switch K and the breaker QF are turned on;

2) a two-go and one-return direct current ice melting mode, that is A and B phase lines are in parallel connection and then in series connection with a C phase line to melt ice, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1, Sdc2 and Sdc4 are turned on, the direct current side switching knife switch Sdc3 is turned off, and the alternating current side isolation knife switch K and the breaker QF are turned on;

3) an open circuit test mode, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1, Sdc2, Sdc3 and Sdc4 are turned off, and the alternating current side isolation knife switch K and the breaker QF are turned on;

4) a zero power test mode, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1 and Sdc4 are turned off, the direct current side switching knife switches Sdc2 and Sdc3 are turned on, and the alternating current side isolation knife switch K and the breaker QF are turned on;

5) a TCR mode, wherein the three-phase knife switch Sac1 is turned on, the three-phase knife switches Sac2 and Sac3 are turned off, the single-phase knife switches SV1, SV2, and SV3 are turned on, the single-phase knife switches SV4 and SV5 are turned off, the direct current side switching knife switches Sdc1, Sdc2, Sdc3 and Sdc4 are turned off, and the alternating current side isolation knife switch K and the breaker QF are turned on; and 6) a TSR mode, wherein the three-phase knife switch Sac1 is turned on, the three-phase knife switches Sac2 and Sac3 are turned off, the single-phase knife switches SV1, SV2, and SV3 are turned on, the single-phase knife switches SV4 and SV5 are turned off, the direct current side switching knife switches Sdc1, Sdc2, Sdc3 and Sdc4 are turned off, and the alternating current side isolation knife switch K and the breaker QF are turned on.

Embodiment 6

Figure 10:
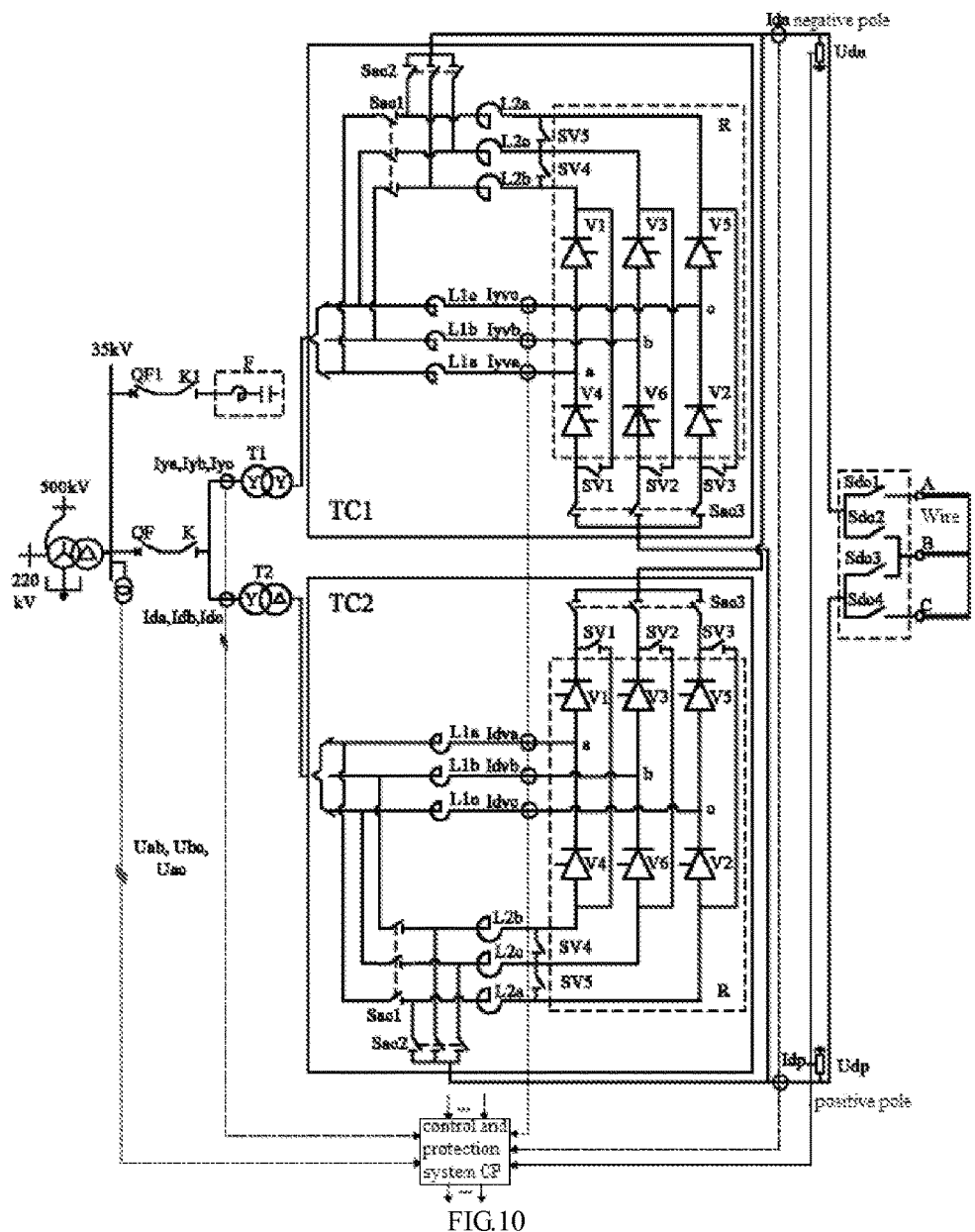
FIG. 10 shows an embodiment of a parallel-connection type twelve-pulse automatic switching circuit for direct current ice melting comprising two sub-switching circuits in parallel connection connected to the 35 kV side of a 500 kV main transformer according to the present invention.

Referring to FIG. 10, in this embodiment, the abovementioned parallel-connection type automatic switching circuit for twelve-pulse direct current ice melting includes two sub-switching circuits which are respectively a sub-switching circuit TC1 and a sub-switching circuit TC2. The sub-switching circuit TC1 and the sub-switching circuit TC2 are connected to the 35 kV side of a 500 kV main transformer through three-phase three-winding rectifier transformers T1 and T2, an isolation knife switch K and a breaker QF. A filter bank F is used to carry out reactive compensation and harmonic suppression, and is connected to a third winding of the rectifier transformers through an isolation knife switch K1 and a breaker QF1.

Three phases of voltages Uab, Ubc, and Uca of the 35 kV bus, valve side currents Iyva, Iyvb, Iyvc, Idva, Idvb, and Idvc, grid side currents Iya, Iyb, Iyc, Ida, Idb, and Idc, direct current side currents Idp and Idn, direct current side voltages Udp and Udn of the rectifier transformers, a monitoring signal of a converter, monitoring signals of knife switches, monitoring signals of the breakers, and the like are communicated to a control and protection system CP. The control and protection system CP sends control instructions to the knife switches, the breakers, and the converter. The implementation solutions of a TCR mode, a TSR mode, a direct current ice melting mode and equivalent test modes thereof, and other modes are as follows:

1) a one-go and one-return direct current ice melting mode, that is, A and B phase lines are in series connection to melt ice, wherein the three-phase knife switch Sac1 is turned off, the three-phase knife switches Sac2 and Sac3 are turned on, the single switches SV1, SV2, and SV3 are turned off, SV4 and SV5 are turned on, the direct current side switching knife switches Sdc1 and Sdc2 are turned on, the direct current side switching knife switches Sdc3 and Sd4 are turned off, and the alternating current side isolation knife switch K and the breaker QF are turned on;

2) a two-go and one-return direct current ice melting mode, that is, A and B phase lines are in parallel connection and then in series connection with a C phase line to melt ice, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1, Sdc2 and Sdc4 are turned on, the direct current side switching knife switch Sdc3 is turned off, and the alternating current side isolation knife switch K and the breaker QF are turned on;

3) an open circuit test mode, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1, Sdc2, Sdc3 and Sdc4 are turned off, and the alternating current side isolation knife switch K and the breaker QF are turned on;

4) a zero power test mode, wherein the three-phase knife switch Sac1 is turned off, the three-phase knife switches Sac2 and Sac3 are turned on, the single-phase knife switches SV1, SV2, and SV3 are turned off, the single-phase knife switches SV4 and SV5 are turned on, the direct current side switching knife switches Sdc1 and Sdc4 are turned off, the direct current side switching knife switches Sdc2 and Sdc3 are turned on, and the alternating current side isolation knife switch K and the breaker QF are turned on;

5) a TCR mode, wherein the three-phase knife switch Sac1 is turned on, the three-phase knife switches Sac2 and Sac3 are turned off, the single-phase knife switches SV1, SV2, and SV3 are turned on, the single-phase knife switches SV4 and SV5 are turned off, the direct current side switching knife switches Sdc1, Sdc2, Sdc3 and Sdc4 are turned off, and the alternating current side isolation knife switch K and the breaker QF are turned on; and 6) a TSR mode, wherein the three-phase knife switch Sac1 is turned on, the three-phase knife switches Sac2 and Sac3 are turned off, the single-phase knife switches SV1, SV2, and SV3 are turned on, the single-phase knife switches SV4 and SV5 are turned off, the direct current side switching knife switches Sdc1, Sdc2, Sdc3 and Sdc4 are turned off, and the alternating current side isolation knife switch K and the breaker QF are turned on.

What is claimed is:

1. A multi-functional automatic switching circuit for direct current ice melting, comprising at least one sub-switching circuit composed of the following members, wherein the sub-switching circuit comprises
a six-pulse converter R with no saturable reactor,
reactors L1a, L1b, and L1c,
reactors L2a, L2b, and L2c,
three-phase knife switches Sac1, Sac2, and Sac3, and
single-phase knife switches SV1, SV2, SV3, SV4, and SV5,
wherein the six-pulse converter R with no saturable reactor of the sub-switching circuit is connected to the reactors L1a, L1b, and L1c, and connected to the reactors L2a, L2b, and L2c, at a connecting side;
wherein the reactors L2a, L2b, and L2c are correspondingly connected to the reactors L1c, L1b, and L1a through the three-phase knife switch Sac1, separately;
wherein the three-phase knife switch Sac3 is connected to one end of the six-pulse converter R at one end and short circuited at the other end;
wherein the three-phase knife switch Sac2 is connected to the reactors L2a, L2b, and L2c at one end and short circuited at the other end;
wherein the single-phase knife switch SV1 is connected, at two ends, to a negative pole of a valve arm V1 and a positive pole of a valve arm V4 of the six-pulse converter R, separately;
wherein the single-phase knife switch SV2 is connected, at two ends, to a negative pole of a valve arm V3 and a positive pole of a valve arm V6 of the six-pulse converter R, separately;
wherein the single-phase knife switch SV3 is connected, at two ends, to a negative pole of a valve arm V5 and a positive pole of a valve arm V2 of the six-pulse converter R, separately; and
wherein the single-phase knife switch SV4 is connected between the reactors L2b and L2c and the connecting side of the six-pulse converter R, and the single-phase knife switch SV5 is connected between the reactors L2a and L2c and the connecting side of the six-pulse converter R.

2. The multi-functional automatic switching circuit for direct current ice melting according to claim 1, wherein the six-pulse converter R does not have a saturable reactor.

3. The multi-functional automatic switching circuit for direct current ice melting according to claim 1,
wherein inductances of the reactors L1a, L1b, and L1c are determined based on a thyristor current changing ratio di/dt and a short circuit current limit; and
wherein inductances of the reactors L1a, L1b, and L1c are 0-0.2 times those of the reactors L2a, L2b, and L2c.

4. The multi-functional automatic switching circuit for direct current ice melting according to any of claims 1 to 3, comprising
a sub-switching circuit,
direct current side switching knife switches Sdc1, Sdc2, Sdc3, and Sdc4,
an isolation knife switch K,
a breaker QF, and
a control and protection system CP;
wherein the direct current side switching knife switches Sdc1 and Sdc2 are in parallel connection and then connected to a short circuited end of the three-phase knife switch Sac3;
wherein the single-phase knife switches Sdc3 and Sdc4 are in parallel connection and then connected to a short circuited end of the three-phase knife switch Sac2;
wherein the sub-switching circuit is connected to a 35 kV or 10 kV bus of a substation through the isolation knife switch K and the breaker QF;
wherein position signals of the knife switches Sac1, Sac2, Sac3, K, SV1, SV2, SV3, SV4, SV5, Sdc1, Sdc2, Sdc3, and Sdc4 and of the breaker QF, alternating current side current signals Iva, Ivb, and Ivc, direct current side current signals Idp and Idn, and direct current side voltage signals Udp and Udn of the converter, and a monitoring signal of the six-pulse converter R are communicated to the control and protection system CP; and
wherein the control and protection system CP sends on/off instructions to the knife switches and the breaker QF, and control/trigger instructions to the six-pulse converter R.

5. The multi-functional automatic switching circuit for direct current ice melting according to any of claims 1 to 3, comprising two sub-switching circuits in series connection, which are respectively a sub-switching circuit TC1 and a sub-switching circuit TC2,
a Y/Y coupling transformer T1,
a Y/Δ coupling transformer T2,
direct current side switching knife switches Sdc1, Sdc2, Sdc3, and Sdc4,
an isolation knife switch K,
a breaker QF, and
a control and protection system CP,
wherein a middle point of a connection between the two sub-switching circuits is grounded, the sub-switching circuit TC1 is connected to the Y/Y coupling transformer T1, and the sub-switching circuit TC2 is connected to the Y/Δ coupling transformer T2;
wherein six-pulse switching converters R with no saturable reactors of the sub-switching circuits TC1 and TC2 are connected through a short circuited end of the three-phase knife switch Sac3;
wherein the direct current side switching knife switches Sdc1 and Sdc2 are in parallel connection and then connected to the short circuited end of the three-phase knife switch Sac2 of the sub-switching circuit TC1;
wherein the single-phase knife switches Sdc3 and Sdc4 are in parallel connection and then connected to a short circuited end of the three-phase knife switch Sac2 of the sub-switching circuit TC2;
wherein the Y/Y coupling transformer T1 and the Y/Δ coupling transformer T2 are connected to a 35 kV or 10 kV or 220 kV bus of a substation through the isolation knife switch K and the breaker QF;
wherein position signals of knife switches Sac1, Sac2, Sac3, K, SV1, SV2, SV3, SV4, SV5, Sdc1, Sdc2, Sdc3, and Sdc4 and of the breaker QF, valve side current signals Iyva, Iyvb, Iyvc, Idva, Idvb, and Idvc, grid side currents Iya, Iyb, Iyc, Ida, Idb, and Idc, direct current side current signals Idp, Idn, and Idgn, and direct current side voltage signals Udp and Udn of the rectifier transformers, and a monitoring signal of the six-pulse converter R, are communicated to the control and protection system CP; and
wherein the control and protection system CP sends on/off instructions to the knife switches and the breaker QF, and control/trigger instructions to the six-pulse converter R.

6. The multi-functional automatic switching circuit for direct current ice melting according to any of claims 1 to 3, comprising
two sub-switching circuits in parallel connection, which are respectively a sub-switching circuit TC1 and a sub-switching circuit TC2,
a Y/Y coupling transformer T1,
a Y/Δ coupling transformer T2,
direct current side switching knife switches Sdc1, Sdc2, Sdc3, and Sdc4,
an isolation knife switch K,
a breaker QF, and
a control and protection system CP,
wherein the sub-switching circuit TC1 is connected to the Y/Y coupling transformer T1,
and the sub-switching circuit TC2 is connected to the Y/Δ coupling transformer T2;
wherein a short circuited end of the three-phase knife switch Sac2 of the sub-switching circuit TC1 is connected to a short circuited end of the three-phase knife switch Sac3 of the sub-switching circuit TC2;
wherein a short circuited end of the three-phase knife switch Sac3 of the sub-switching circuit TC1 is connected to a short circuited end of the three-phase knife switch Sac3 of the sub-switching circuit TC2;
wherein the direct current side switching knife switches Sdc1 and Sdc2 are in parallel connection and then connected to the short circuited end of the three-phase knife switch Sac2 of the sub-switching circuit TC1;
wherein the single-phase knife switches Sdc3 and Sdc4 are in parallel connection and then connected to the short circuited end of the three-phase knife switch Sac2 of the sub-switching circuit TC2;
wherein the Y/Y coupling transformer T1 and the Y/Δ coupling transformer T2 are connected to a 35 kV or 10 kV or 220 kV bus of a substation through the isolation knife switch K and the breaker QF;
wherein position signals of knife switches Sac1, Sac2, Sac3, K, SV1, SV2, SV3, SV4, SV5, Sdc1, Sdc2, Sdc3, and Sdc4 and of the breaker QF, valve side current signals Iyva, Iyvb, Iyvc, Idva, Idvb, and Idvc, grid side currents Iya, Iyb, Iyc, Ida, Idb, and Idc, direct current side current signals Idp and Idn, and direct current side voltage signals Udp and Udn of the rectifier transformers and a monitoring signal of the six-pulse converter R are communicated to the control and protection system CP; and
wherein the control and protection system CP sends on/off instructions to the knife switches and the breaker QF, and control/trigger instructions to the six-pulse converter R.

7. The multi-functional automatic switching circuit for direct current ice melting according to claim 4, wherein when the automatic switching circuit for six-pulse direct current ice melting, comprising one sub-switching circuit, operates to produce direct current ice melting, a direct current side is not grounded.

8. The multi-functional automatic switching circuit for direct current ice melting according to claim 5,
wherein when a series-connection type automatic switching circuit for twelve-pulse direct current ice melting, comprising two sub-switching circuits, operates to produce direct current ice melting, a connecting point of two six-pulse converters R at the direct current side is directly grounded;
wherein the series-connection type automatic switching circuit for twelve-pulse direct current ice melting keeps twelve pulses both when operating to produce direct current ice melting and when operating not to produce direct current ice melting; and
wherein inductances of reactors L1a, Lib, and L1c of the series-connection type automatic switching circuit for twelve-pulse direct current ice melting may be 0, that is, the reactors L1a, L1b, and L1c are not provided.

9. The multi-functional automatic switching circuit for direct current ice melting according to claim 6,
wherein when a parallel-connection type automatic switching circuit for twelve-pulse direct current ice melting, comprising two sub-switching circuits, operates to produce direct current ice melting, a direct current side is not grounded;
wherein the parallel-connection type automatic switching circuit for twelve-pulse direct current ice melting keeps twelve pulses both when operating to produce direct current ice melting and when operating not to produce direct current ice melting; and
wherein inductances of reactors L1a, L1b, and L1c of the parallel-connection type automatic switching circuit for twelve-pulse direct current ice melting may be 0, that is, the reactors L1a, L1b, and L1c are not provided.

10. A switching method of a multi-functional automatic switching circuit for direct current ice melting, comprising the following switching modes:
   1) a one-go and one-return direct current ice melting mode, that is, A and B phase lines are in series connection to melt ice, wherein three-phase knife switch Sac1 is turned off, three-phase knife switches Sac2 and Sac3 are turned on, single-phase knife switches SV1, SV2, and SV3 are turned off, SV4 and SV5 are turned on, direct current side switching knife switches Sdc1 and Sdc2 are turned on, direct current side switching knife switches Sdc3 and Sd4 are turned off, and wherein an alternating current side isolation knife switch K and a breaker QF are turned on;
   2) a two-go and one-return direct current ice melting mode, that is, A and B phase lines are in parallel connection and then in series connection with a C phase line to melt ice, wherein three-phase knife switch Sac1 is turned off, three-phase knife switches Sac2 and Sac3 are turned on, single-phase knife switches SV1, SV2, and SV3 are turned off, single-phase knife switches SV4 and SV5 are turned on, direct current side switching knife switches Sdc1, Sdc2 and Sdc4 are turned on, a direct current side switching knife switch Sdc3 is turned off, and wherein an alternating current side isolation knife switch K and a breaker QF are turned on;
   3) an open circuit test mode, wherein three-phase knife switch Sac1 is turned off, three-phase knife switches Sac2 and Sac3 are turned on, single-phase knife switches SV1, SV2, and SV3 are turned off, single-phase knife switches SV4 and SV5 are turned on, direct current side switching knife switches Sdc1, Sdc2, Sdc3 and Sdc4 are turned off, and wherein an alternating current side isolation knife switch K and a breaker QF are turned on;
   4) a zero power test mode, wherein three-phase knife switch Sac1 is turned off, three-phase knife switches Sac2 and Sac3 are turned on, single-phase knife switches SV1, SV2, and SV3 are turned off, single-phase knife switches SV4 and SV5 are turned on, direct current side switching knife switches Sdc1 and Sdc4 are turned off, direct current side switching knife switches Sdc2 and Sdc3 are turned on, and wherein an alternating current side isolation knife switch K and a breaker QF are turned on;
   5) a TCR mode, wherein three-phase knife switch Sac1 is turned on, three-phase knife switches Sac2 and Sac3 are turned off, single-phase knife switches SV1, SV2, and SV3 are turned on, single-phase knife switches SV4 and SV5 are turned off, direct current side switching knife switches Sdc1, Sdc2, Sdc3 and Sdc4 are turned off, and wherein an alternating current side isolation knife switch K and a breaker QF are turned on; and
   6) a TSR mode, wherein three-phase knife switch Sac1 is turned on, three-phase knife switches Sac2 and Sac3 are turned off, single-phase knife switches SV1, SV2, and SV3 are turned on, single-phase knife switches SV4 and SV5 are turned off, direct current side switching knife switches Sdc1, Sdc2, Sdc3 and Sdc4 are turned off, and wherein an alternating current side isolation knife switch K and a breaker QF are turned on.

11. The switching method of the multi-functional automatic switching circuit for direct current ice melting according to claim 10, wherein in either of the one-go and one-return direct current ice melting mode, the two-go and one-return direct current ice melting mode, the open circuit test mode and the zero power test mode, reactors L1a, L1b and L1c function as commutation reactors, and reactors L2a, L2b and L2c function as smoothing reactors.

12. The switching method of the multi-functional automatic switching circuit for direct current ice melting according to claim 11, wherein in the TCR mode, reactors L1a, L1b and L1c and reactors L2a, L2b and L2c function as phase controlled reactors, and wherein in the TSR mode, the reactors L1a, L1b and L1c and the reactors L2a, L2b and L2c function as switched reactors.

\* \* \* \* \*